US012052681B2

(12) United States Patent
Ananth

(10) Patent No.: US 12,052,681 B2
(45) Date of Patent: *Jul. 30, 2024

(54) USER EQUIPMENT LOCATION DETERMINATION USING DIFFERENT COVERAGE TYPES

(71) Applicant: Aalyria Technologies, Inc., Livermore, CA (US)

(72) Inventor: Sharath Ananth, Cupertino, CA (US)

(73) Assignee: Aalyria Technologies, Inc., Livermore, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/052,910

(22) Filed: Nov. 5, 2022

(65) Prior Publication Data

US 2023/0073733 A1 Mar. 9, 2023

Related U.S. Application Data

(63) Continuation of application No. 17/324,697, filed on May 19, 2021, now Pat. No. 11,516,768, which is a (Continued)

(51) Int. Cl.
*H04W 64/00* (2009.01)
*H04B 7/06* (2006.01)
(Continued)

(52) U.S. Cl.
CPC ........ *H04W 64/006* (2013.01); *H04B 7/0617* (2013.01); *H04W 8/24* (2013.01); *H04W 16/28* (2013.01); *H04W 24/10* (2013.01)

(58) Field of Classification Search
CPC ..... H04W 64/00; H04W 64/006; H04W 8/24; H04W 16/28; H04W 24/10; H04B 7/0617;
(Continued)

(56) References Cited

U.S. PATENT DOCUMENTS 5,852,630 A 12/1998 Langberg et al.
9,571,978 B1 * 2/2017 Ananth ................. H04W 4/023
(Continued)

OTHER PUBLICATIONS

"3rd Generation Partnership Project; Technical Specification Group Radio Access Network; Study on NR positioning support (Release 16)", 3GPP Standard; Technical Report; 3GPP TR 38.855, 3rd Generation Partnership Project (3GPP), V1 .0.3, Mar. 28, 2019 (Mar. 28, 2019), pp. 1-186, XP051723180, [retrieved on Mar. 28, 2019].

(Continued)

*Primary Examiner* — Siu M Lee
(74) *Attorney, Agent, or Firm* — Platinum Intellectual Property PC

(57) ABSTRACT

Determining a location of a user equipment includes transmitting, by one or more processors from a network node, a first beam having a first frequency range in a first area and a second beam having a second frequency range in a second area. The first area is larger than and encompasses the second area. A request for determining the location of the user equipment is received. The one or more processors may then cause the second beam to sweep within the first area, receive a second signal from the user equipment indicating when the second beam is swept over the location of the user equipment and data related to signal measurements of the second beam at the user equipment, and determine the location of the user equipment based on a pointing direction of the second beam relative to a position of the node of the network and the received data.

20 Claims, 9 Drawing Sheets

Related U.S. Application Data continuation of application No. 17/018,631, filed on Sep. 11, 2020, now Pat. No. 11,044,694.

(60) Provisional application No. 62/900,090, filed on Sep. 13, 2019.

(51) Int. Cl.
*H04W 8/24* (2009.01)
*H04W 16/28* (2009.01)
*H04W 24/10* (2009.01)

(58) Field of Classification Search
CPC . G01S 5/0036; G01S 5/02; G01S 1/08; G01S 1/0428
See application file for complete search history.

(56) References Cited

U.S. PATENT DOCUMENTS

| | | | | |
|---|---|---|---|---|
| 11,044,694 | B2* | 6/2021 | Ananth | G01S 1/0428 |
| 11,516,768 | B2* | 11/2022 | Ananth | H04W 24/10 |
| 2005/0261028 | A1 | 11/2005 | Chitrapu | |
| 2015/0236781 | A1 | 8/2015 | Jalali et al. | |
| 2017/0098889 | A1 | 4/2017 | Henry et al. | |
| 2017/0310550 | A1 | 10/2017 | Mandle et al. | |
| 2017/0374637 | A1* | 12/2017 | Akkarakaran | H04W 64/006 |
| 2018/0054251 | A1* | 2/2018 | Alex | H04B 7/18506 |
| 2018/0176065 | A1 | 6/2018 | Deng et al. | |
| 2018/0279134 | A1 | 9/2018 | Malik et al. | |
| 2019/0132828 | A1 | 5/2019 | Kundargi et al. | |
| 2019/0229789 | A1 | 7/2019 | Zhang et al. | |
| 2019/0281574 | A1 | 9/2019 | Reial et al. | |

OTHER PUBLICATIONS

Choi, Woo-Jin, 5G Wireless Access Technology Standardization Trend, OSIA S&TR Journal, ISSN 1738-9887 vol. 30, No. 04, Dec. 2017.

Extended European Search Report of EP 20862496.5 dated Jul. 13, 2023.

International Search Report and Written Opinion for Application No. PCT/US2020/050674 dated Dec. 17, 2020.

ZTE et al: "NR DL-TDOA positioning procedure", 3GPP Draft; R2-1903096, 3rd Generation Partnership Project (3GPP), vol. RAN WG2, No. Xi'an, China; Apr. 8, 2019-Apr. 12, 2019 Mar. 29, 2019 (Mar. 29, 2019), XP051692374, Retrieved from the Internet: URL:http://www.3gpp.org/ftp/tsg%5Fran/WG2%5FRL2/TSGR2%5F105bis/Docs/R2%2D1903096%2Ezip [retrieved on Mar. 29, 2019].

First office action by China Patent Office regarding application No. 202080049218.X, dated Sep. 16, 2023.

* cited by examiner

USER EQUIPMENT LOCATION DETERMINATION USING DIFFERENT COVERAGE TYPES

CROSS REFERENCE TO RELATED APPLICATIONS

The present application is a continuation of U.S. patent application Ser. No. 17/018,631, filed Sep. 11, 2020, which claims the benefit of U.S. Patent Application No. 62/900,090, filed Sep. 13, 2019, the entire disclosure of which are incorporated by reference herein.

BACKGROUND

Information can be transmitted over directional point-to-point networks or point-to-multipoint networks, such as aerospace and other mobile networks. In such networks, links can be formed between pairs of nodes by aiming transceivers of each node pair towards each other. Links can also be formed by steering the transceivers of a network node either toward a discrete user terminal or node or toward some discrete point to cover a general geographic area. In some implementations, nodes may include non-geostationary satellite orbit (NGSO) satellites or other high-altitude platforms (HAPs) that are in motion relative to the Earth.

BRIEF SUMMARY

The technology described herein provides for methods, systems, or mediums for implementing 5G NR using non-terrestrial nodes, such as high-altitude platforms. The methods, systems, or mediums allow for 5G-enabled nodes to coexist with other nodes providing other types of coverage. In addition, the methods and systems allow for networks to utilize resources made available through 5G NR, as well as other types of coverage.

Aspects of the disclosure provide for a method of determining a location of a user equipment. The method includes transmitting, by one or more processors from a node of a network, a first beam having a first frequency range in a first area and a second beam having a second frequency range in a second area, the first area being larger than the second area and encompassing the second area; receiving, by the one or more processors, a request for determining the location of the user equipment in a first signal that is in the first frequency range; causing, by the one or more processors, the second beam to sweep within the first area; receiving, by the one or more processors, a second signal from the user equipment indicating when the second beam is swept over the location of the user equipment and data related to signal measurements of the second beam at the user equipment; and determining the location of the user equipment based on a pointing direction of the second beam relative to a position of the node of the network and the data related to the signal measurements.

In one example, the first frequency range is within a range of 4G Long-Term Evolution (LTE) communication signals, and the second frequency range is within a range of 5G New Radio (NR) communication signals. In another example, transmitting the second beam occurs after the receiving of the request. In a further example, the request includes an indication of a capability of the user equipment to detect the first frequency range and the second frequency range.

In yet another example, the causing of the second beam to sweep within the first area includes physically adjusting a pointing direction of the second beam In a still further example, the causing of the second beam to sweep within the first area includes electronically adjusting a pointing direction of the second beam using beamforming techniques. In another example, the causing of the second beam to sweep includes causing the second beam to sweep in a set pattern. In a further example, the causing of the second beam to sweep within the first area until the location of the user equipment is determined.

In yet another example, the method also includes transmitting a third beam having a third frequency range in a third area, the third area being smaller than the first area and being encompassed by the first area; causing the third beam to sweep within the first area; and receiving a third signal from the user equipment indicating when the third beam is swept over the location of the user equipment and second data related to second signal measurements of the third beam at the user equipment; and wherein the determining of the location of the user equipment is further based on a pointing direction of the third beam and the second data related to the second signal measurements.

Other aspects of the disclosure provide for a system for determining a location of a user equipment, the system comprising one or more transceivers configured to transmit and receive communication beams comprising one or more signals, the communication beams including a first beam having a first frequency range and a second beam having a second frequency range; and one or more processors configured to transmit, using the one or more transceivers, the first beam in a first area and the second beam in a second area, the first area being larger than the second area and encompassing the second area; receive, via the one or more transceivers, a request for determining the location of the user equipment in a first signal that is in the first frequency range; cause the second beam to sweep within the first area; receive, via the one or more transceivers, a second signal from the user equipment indicating when the second beam is swept over the location of the user equipment and data related to signal measurements of the second beam at the user equipment; and determine the location of the user equipment based on a pointing direction of the second beam relative to a position of the system and the data related to the signal measurements.

In one example, the first frequency range is within a range of 4G Long-Term Evolution (LTE) communication signals, and the second frequency range is within a range of 5G New Radio (NR) communication signals. In another example, the one or more processors are configured to transmit the second beam after receiving the request. In a further example, the request includes an indication of a capability of the user equipment to detect the first frequency range and the second frequency range.

In yet another example, the system also includes a gimbal, and the one or more processors are configured to cause the second beam to sweep using the gimbal to physically adjust a pointing direction of the second beam. In a still further example, the one or more processors are configured to cause the second beam to sweep within the first area using beamforming techniques. In another example, the one or more processors are configured to cause the second beam to sweep in a set pattern. In a further example, the one or more processors are configured to cause the second beam to sweep within the first area until the location of the user equipment is determined.

In yet another example, the one or more transceivers are also configured to transmit and receive a third beam having a third frequency range, and the one or more processors are also configured to transmit the third beam in a third area, the third area being smaller than the first area and being encompassed by the first area; cause the third beam to sweep within the first area; receive a third signal from the user equipment indicating when the third beam is swept over the location of the user equipment and second data related to second signal measurements of the third beam at the user equipment; and determine the location of the user equipment further based on a pointing direction of the third beam and the second data related to the second signal measurements. In a still further example, the system also includes a high-altitude platform terminal.

Further aspects of the disclosure provide for a non-transitory, computer-readable medium including instructions that, when executed by one or more processors, cause the one or more processors to perform a method of determining a location of a user equipment. The method includes transmitting a first beam having a first frequency range in a first area and a second beam having a second frequency range in a second area, the first area being larger than the second area and encompassing the second area; receiving a request for determining the location of the user equipment in a first signal that is in the first frequency range; causing the second beam to sweep within the first area; receiving a second signal from the user equipment indicating when the second beam is swept over the location of the user equipment and data related to signal measurements of the second beam at the user equipment; and determining the location of the user equipment based on a pointing direction of the second beam and the data related to the signal measurements.

DETAILED DESCRIPTION

Overview

Figure 1:
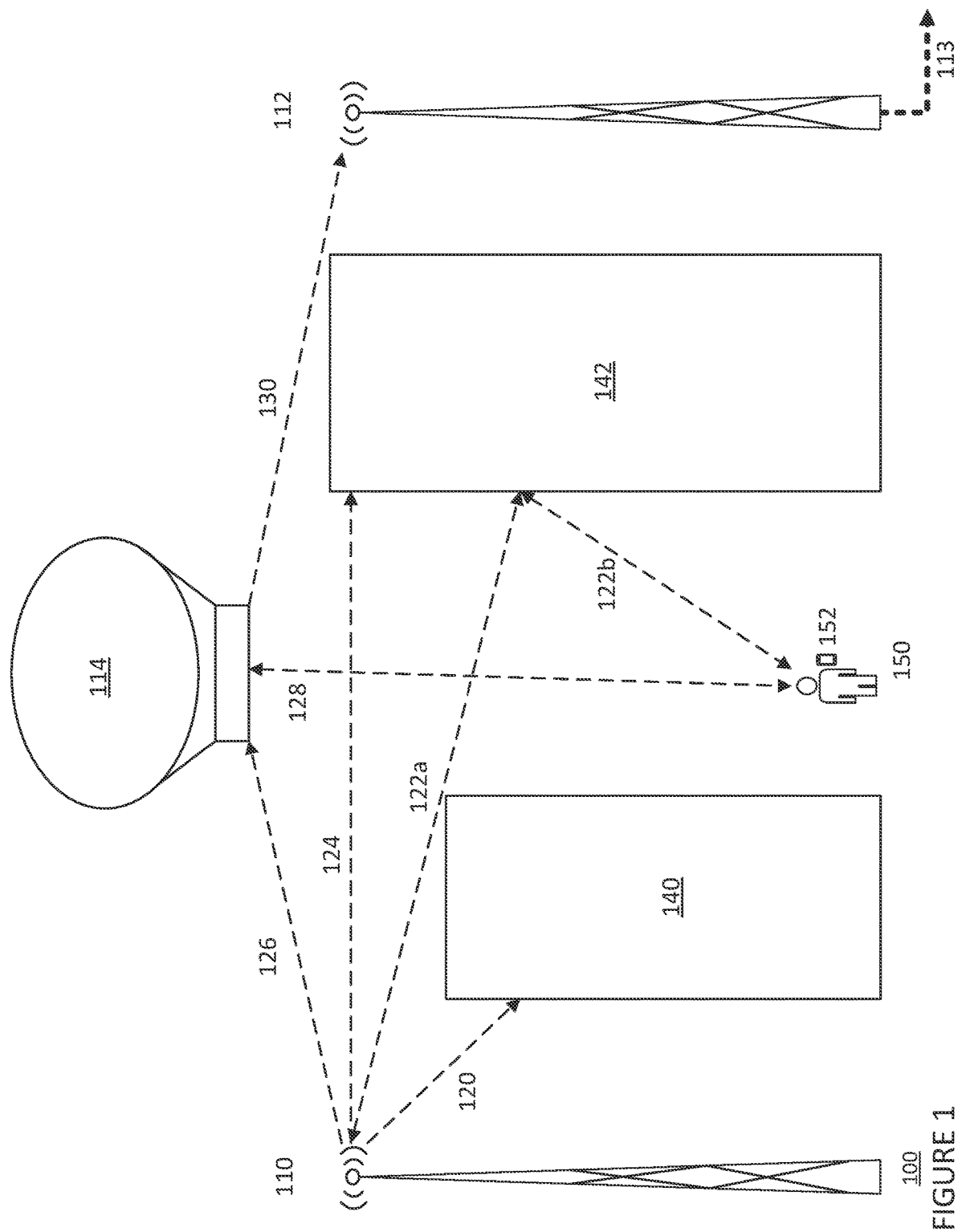
FIG. 1 is a pictorial diagram of a portion of an example network in accordance with aspects of the disclosure.

The technology relates to implementing 5G NR using non-terrestrial nodes, such as high-altitude platforms. In particular, the 5G-enabled non-terrestrial nodes may be required to coexist with other nodes providing other types of coverage, such as 4G LTE. In areas where there is 5G coverage as well as another type of network coverage is available, there is a need to coordinate between the different types of signals to provide coverage to user equipment (UE) in these areas. There are also new opportunities made available by the presence of multiple types of signals that may be taken advantage of in order to increase coverage or capacity of the overall network.

For example, a network may include a plurality of terrestrial nodes, such as towers, located in a geographic area. The network may be configured to provide 4G LTE coverage to the geographic area. In some implementations, the network may additionally be configured to provide 5G NR coverage to the geographic area or another type of coverage. One or more non-terrestrial nodes may be included in the network temporarily or permanently. For example, a high-altitude balloon may be added as a node of the network when the high-altitude balloon is in range of one of the terrestrial nodes of the network. The high-altitude balloon may be configured to provide large area coverage to the geographic area, such that a signal beam transmitted from the high-altitude balloon may cover an area including multiple terrestrial nodes in the geographic area. The high-altitude balloon may also be configured to transmit narrower signal beams focused on a smaller area than the large area coverage. The one or more non-terrestrial nodes may be equipped to provide 5G NR coverage. In some examples, the one or more non-terrestrial nodes are also equipped to provide 4G LTE coverage and/or another type of coverage. Alternatively, the one or more non-terrestrial nodes of the network equipped for 5G NR coverage may comprise a second, separate network to the networking including the plurality of terrestrial nodes.

In one aspect of the technology, resource allocation for 5G coverage in an area may be defined based on the spectrum that is already implemented in the area. In another aspect, spectrum may be assigned dynamically for 5G coverage by strategically requesting or blocking resources or by tracking what resources become available in scheduling. In a further aspect, locating user equipment (UE) may be accomplished using a 5G beam in coordination with a wide coverage beam In yet another aspect, performing handovers between a first node and a second node may include a protocol for updating or disassociating a physical cell identifier of a first node prior to connecting with the second node, which may have the same identifier. In an additional aspect, the backhaul capacity may be increased for non-terrestrial nodes by implementing distributed backhaul from a non-terrestrial node to a plurality of donor nodes of the network. These implementations will be discussed in further detail below.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Example Systems and Network

FIG. 1 is a pictorial diagram of an example system 100 of network nodes in a network. The network may include nodes mounted on various land- and air-based devices, some of which may change position with respect to other nodes in the network over time. For example, as shown in FIG. 1, the network includes, as nodes, a first terrestrial tower 110 and a second terrestrial tower 112. The network also includes as anode a high-altitude platform 114. As shown, HAP 114 is a balloon. In other embodiments, the HAP may be a blimp, an airplane, an unmanned aerial vehicle (UAV) such as a drone, a satellite, or another platform capable of low Earth orbit.

Nodes in the network may be equipped to transmit and receive mmWave signals or other very high frequency signals. Additionally or alternatively, nodes in the network may be equipped to transmit and receive other radio-frequency signals, optical signals, or other communication signal capable of traveling through free space. Arrows shown projecting from nodes represent possible paths 120, 122a, 122b, 124, 126, 128, 130 for a transmitted communication signal. As shown in FIG. 1, some possible paths may be blocked by buildings, such as buildings 140, 142. For example, a signal following path 120 from node 110 may be angled below the horizon and be blocked by building 140. A signal following path 122a from node 110 may be angled above path 120, avoiding building 140, but then may contact building 142. The signal following path 122a may reflect off building 142 and follow path 122b towards the ground location of a user 150, carrying a client device 152. A signal following path 124 from node 110 may be angled towards or above the horizon, nearly parallel to the ground, passing over building 140, but then may be blocked by building 142. A signal following path 126 from node 110 may be angled above the horizon and reach node 114. A signal following path 128 from node 114 directed to the ground location of user 150. A signal following path 130 from node 114 may be angled below the horizon, pass over building 142, and reach node 112.

Also shown in FIG. 1, a signal may be transmitted from the client device 152 of the user 150 back towards one or more nodes of the network. For example, a signal from the client device 152 may be transmitted back along paths 122b and 122a towards node 110. Another signal from the client device 152 may be transmitted back along path 128 towards node 114. In addition, multiple users or multiple client devices may form bi-directional access links with a given node of the network at a given point in time, in addition to the user 150 and the client device 152 shown in FIG. 1.

The network nodes as shown in FIG. 1 is illustrative only, and the network may include additional or different nodes. For example, in some implementations, the network may include additional HAPs and/or additional terrestrial towers. When the network includes at least one low Earth orbit or high Earth orbit satellite as well as one other type of HAP, the network may be defined as a hybrid HAP/satellite network.

Figure 2:
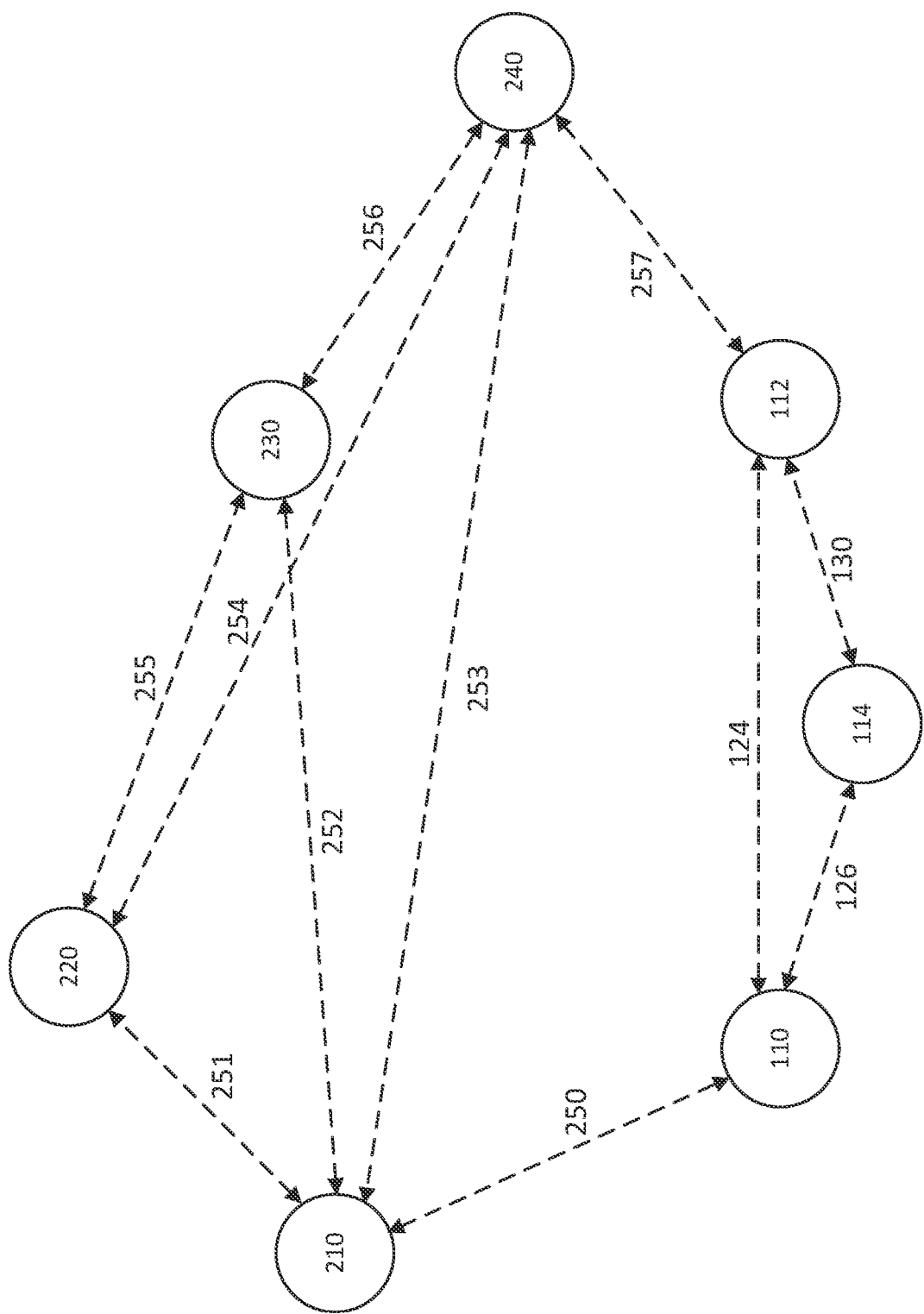
FIG. 2 is a diagram of an example network in accordance with aspects of the disclosure.

For example, as shown in FIG. 2, the network 200 that includes the system 100 may also include as nodes additional terrestrial towers 210, 220, 230, and 240. Arrows shown between a pair of nodes represent possible communication paths between the nodes. In addition to paths 124, 126, and 130 corresponding to the paths shown in FIG. 1, paths 250-257 are shown between the nodes. The network 200 as shown in FIG. 2 is illustrative only, and in some implementations the network 200 may include additional or different nodes. The status information received from the nodes of the network may include the location information of HAP 114 or weather conditions at locations of terrestrial towers 110, 112, 210, 220, 230, and 640 at a current time or a future time. The location information of HAP 114 may include a projected trajectory or set location, such as a future location at the future time that is in signal range of the terrestrial towers 110, 112.

In some implementations, the network may serve as an access network for client devices such as cellular phones, laptop computers, desktop computers, wearable devices, or tablet computers. For example, nodes 110, 112, 114 may connect to the datacenters via wireless, fiber, or cable backbone network links or transit networks operated by third parties. The nodes 110, 112, 114 may provide wireless access for the users, and may forward user requests to the datacenters and return responses to the users via the backbone network links.

In particular, the first terrestrial tower 110, the second terrestrial tower 112, and the HAP 114 may include wireless transceivers configured to operate in a cellular or other mobile network, such as 5G NR (new radio) networks or LTE networks. The nodes 110, 112, 114 may operate as gNodeB stations, eNodeB stations, or other wireless access points, such as WiMAX or UMTS access points. One or more terrestrial towers in the network may include an optical fiber or other link connecting the one or more terrestrial towers to another terrestrial tower or datacenter. For example, the second terrestrial tower 112 may include fiber 113, shown by a dotted arrow, that connects to another terrestrial tower (not shown). As shown in FIG. 1, user 150 carrying a client device 152 may be configured to communicate with one or more of the nodes in the network. The network also may be connected to a larger network, such as the Internet, and may be configured to provide a client device with access to resources stored on or provided through the larger computer network.

Figure 3:
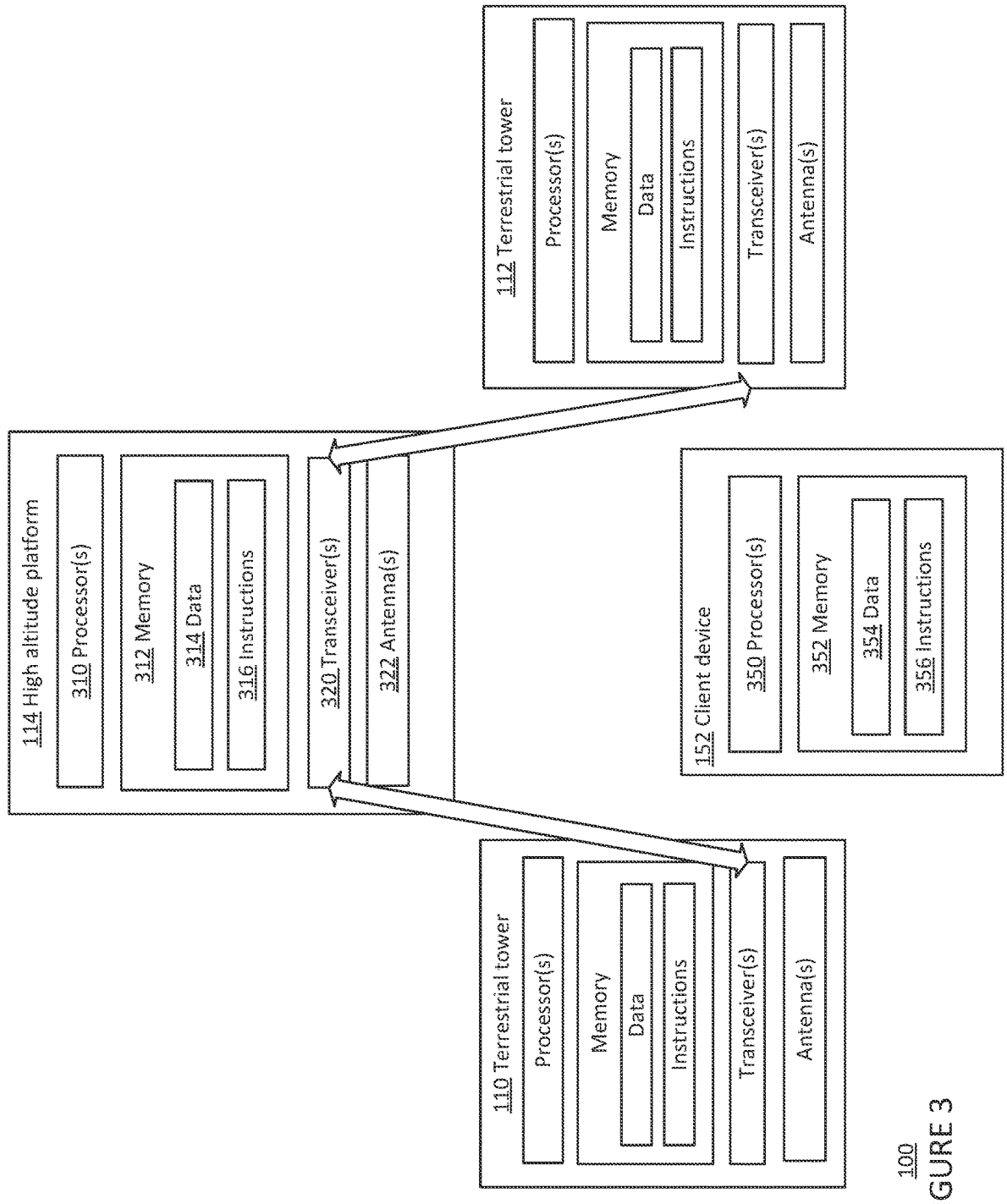
FIG. 3 is a functional diagram of the portion of the network shown in FIG. 1 in accordance with aspects of the disclosure.

As shown in FIG. 3, each node, such as first terrestrial tower 110, second terrestrial tower 112, and HAP 114, may include one or more transceivers configured to transmit and receive communication signals and create one or more communication links with another node in the network. Referring to HAP 114 as an example, each of the nodes, may include one or more processors 310, memory 312, one or more transceivers 320, and one or more antennas 322. While only terrestrial towers 110, 112 and HAP 114 are shown, other terrestrial towers and HAPs in the network may have the same or as similar configurations.

The one or more processors 310 may be any conventional processors, such as commercially available CPUs. Alternatively, the one or more processors may be a dedicated device such as an application specific integrated circuit (ASIC) or other hardware-based processor, such as a field programmable gate array (FPGA). The one or more processors 310 may be configured to operate according to a given protocol architecture for a mobile network, such as 5G NR architecture or LTE radio protocol architecture. Although FIG. 3 functionally illustrates the one or more processors 310 and memory 312 as being within the same block, it will be understood that the one or more processors 310 and memory 312 may actually comprise multiple processors and memories that may or may not be stored within the same physical housing. Accordingly, references to a processor or computer will be understood to include references to a collection of processors or computers or memories that may or may not operate in parallel.

Memory 312 stores information accessible by the one or more processors 310, including data 314, and instructions 316, that may be executed by the one or more processors 310. The memory may be of any type capable of storing information accessible by the processor, including non-transitory and tangible computer-readable mediums containing computer readable instructions such as a hard-drive, memory card, ROM, RAM, DVD or other optical disks, as well as other write-capable and read-only memories. The system and method may include different combinations of the foregoing, whereby different portions of the data 314 and instructions 316 are stored on different types of media. In the memory of each node, such as memory 312 of HAP 114, a forwarding information base or forwarding table may be stored that indicate how signals received at each node should be forwarded, or transmitted. For example, the forwarding table stored in memory 312 may indicate that a signal received from ground station 110 should be forwarded to ground station 112.

Data 314 may be retrieved, stored or modified by the one or more processors 310 in accordance with the instructions 316. For instance, although the system and method are not limited by any particular data structure, the data 314 may be stored in computer registers, in a relational database as a table having a plurality of different fields and records, XML documents or flat files. The data 314 may also be formatted in any computer-readable format such as, but not limited to, binary values or Unicode. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data 314 may comprise any information sufficient to identify the relevant information, such as numbers, descriptive text, proprietary codes, references to data stored in other areas of the same memory or different memories (including other network locations) or information that is used by a function to calculate the relevant data.

The instructions 316 may be any set of instructions to be executed directly (such as machine code) or indirectly (such as scripts) by the one or more processors 310. For example, the instructions 316 may include the given protocol architecture for the mobile network of which the node is a part. The given protocol architecture may include a split architecture between a central unit and a distributed unit. In addition, the given protocol architecture may define a control plane, a user plane, or other protocol layers. The given protocol architecture may also include an interface that defines a plurality of messages for use in communication between the protocol layers. The instructions 316 may be stored as computer code on the computer-readable medium. In that regard, the terms "instructions" and "programs" may be used interchangeably herein. The instructions 316 may be stored in object code format for direct processing by the one or more processors 310, or in any other computer language including scripts or collections of independent source code modules that are interpreted on demand or compiled in advance. Functions, methods and routines of the instructions 316 are explained in more detail below.

The one or more transceivers 320 may include at least one wireless transceiver mounted to actuators that can be controlled, or steered, to point in a desired direction via the one or more antennas 322. For example, an actuator may be a gimbal configured to move about one or more axes. To form a wireless link between two nodes, such as the node associated with the HAP 114 and the node associated with the first terrestrial tower 110, the wireless transceivers of the respective nodes can be controlled to point in the direction of one another so that data can be sent and received between the nodes. For nodes with fiber or cable connections, such as second terrestrial tower 112, the one or more transceivers 320 may also include at least one transceiver configured to communicate via a fiber or cable connection.

As further shown in FIG. 3, the client device 152 associated with user 150 may be a personal computing device or a server with one or more processors 350, memory 352, data 354, and instructions 356 similar to those described above with respect to the one or more processors 310, memory 312, data 314, and instructions 316. Personal computing devices may include a personal computer that has all of the components normally used in connection with a personal computer such as a central processing unit (CPU), memory (e.g., RAM and internal hard drives) storing data and instructions, an electronic display (e.g., a monitor having a screen, a small LCD touch-screen, a projector, a television, or any other electrical device that is operable to display information), user input (e.g., a mouse, keyboard, touch-screen or microphone), camera, speakers, a network interface device, and all of the components used for connecting these elements to one another. Personal computing devices may also include mobile devices such as PDAs, cellular phones, and the like. Indeed, client device 152 may be any device capable of processing instructions and transmitting data to and from humans and other computers including general purpose computers, network computers lacking local storage capability, and set-top boxes for televisions. In some embodiments, client devices may be associated with one or more self-defined network (SDN) applications and may have one or more northbound interface (NBI) drivers.

Figure 4:
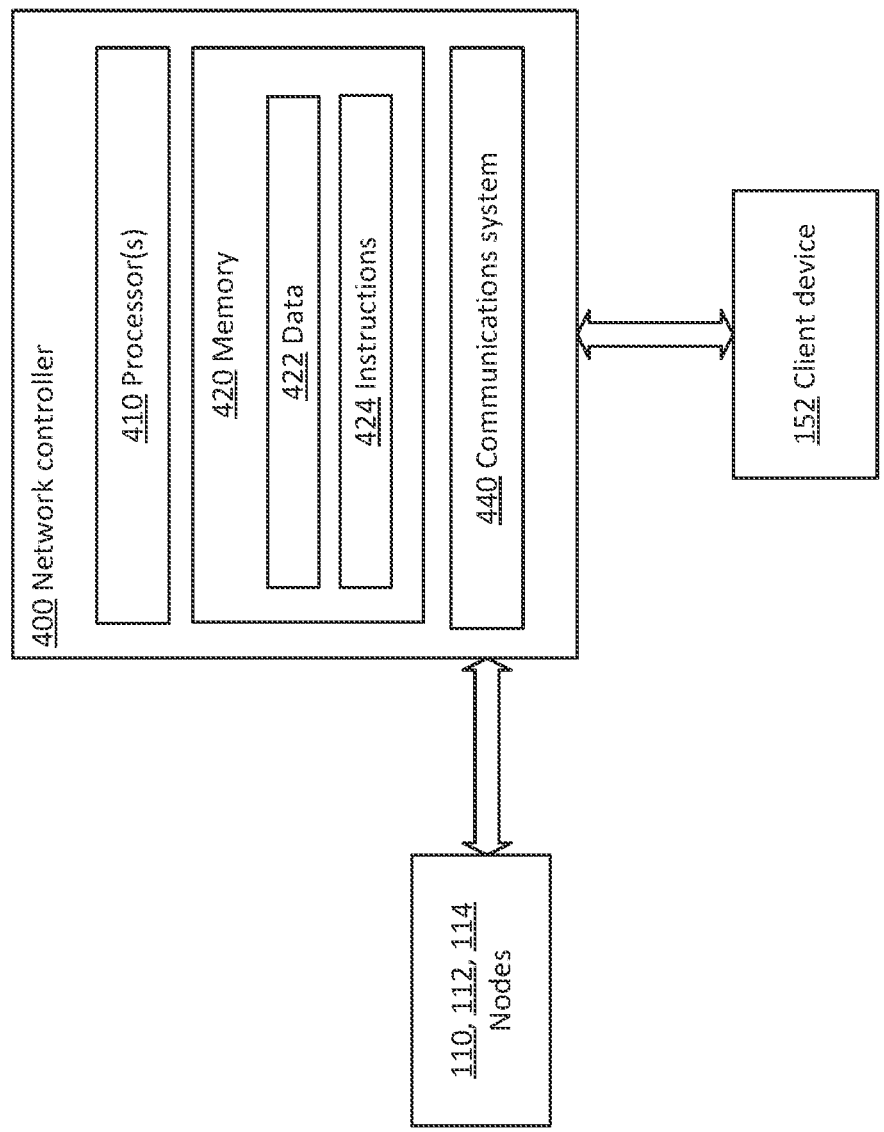
FIG. 4 is a functional diagram of a network controller in accordance with aspects of the disclosure.

In some implementations, the network can be an SDN that is controlled by an SDN controller, such as network controller 400 depicted in FIG. 4. The network controller 400 may be located at one of the network nodes or at a separate platform, such as, for example, in a datacenter. The nodes of the network, including nodes 110, 112, 114 may be configured to communicate with one another using the steerable transceivers, such as the one or more transceivers 320 or the one or more antennas 322. As the HAPs in the network, such as HAP 114, move with respect to other nodes in the network, such as terrestrial towers 110, 112, some network links may become infeasible due to range of the transceivers or obstacles between the nodes. Thus, the configuration of the network may require regular (i.e., periodic) or irregular reconfiguration using the network controller 400 to maintain connectivity and to satisfy determined network flows.

FIG. 4 is a block diagram of network controller 400. The network controller 400 may be configured to send control messages to the nodes of the network to provide reconfiguration according to updated topology, to pass routing information, and to schedule reconfigurations to transmit client data. As shown in FIG. 4, the network controller 400 may include one or more processors 410, memory, 420, and communications system 440. The one or more processors 410 may be similar to the one or more processors 310 described above. Memory 420 may store information accessible by the one or more processors 410, including data 422 and instructions 424 that may be executed by processor 410. Memory 420, data 422, and instructions 424 may be configured similarly to memory 312, data 314, and instructions 316 described above. The data 422 may include a table representing all of the available nodes and possible links in the network 100 at a given time or time frame. The instructions 424 may include one or more modules for managing topology and routing, determining topology, determining network flows, solving for network configurations, controlling flight of a given HAP, or scheduling future network configurations.

The communications system 440 may be configured to communicate with the nodes of network, such as nodes 110, 112, 114, as well as one or more client devices, such as client device 152. In some embodiments, the communication system 440 includes a Control to Data-Plane Interface (CDPI)

driver configured to communicate with a CDPI agent at each of the nodes 110, 112, 114. In addition, the communications system 440 of the network controller 400 may include one or more NBI agents configured to communicate with an NBI driver at each client device associated with one or more SDN applications. The communication system 440 may optionally or alternatively be configured to transmit and receive a signal via radio frequencies, optical frequencies, optical fiber, cable, or other communication means to and from the nodes in the network and the one or more client devices.

Example Implementations and Methods

In addition to the operations described above and illustrated in the figures, various implementations and methods will now be described. It should be understood that the described operations and steps do not have to be performed in the precise order provided below. Rather, various operations and steps can be handled in a different order or simultaneously, and operations and steps may also be added or omitted.

In an aspect of the technology, location determination for a UE may be performed using a plurality of beams having different frequencies. The plurality of beams may include beams for different coverage types. When nodes of the network are far from each other, coverage provided by nodes cover a large geographic area, and/or coverage of nodes do not overlap, typical trilateration may not be possible for determining a location of a UE. In trilateration, overlapping coverage areas of three different nodes are used to pinpoint a UE location based on the distances of a UE from each of the three different nodes.

Figure 5A:
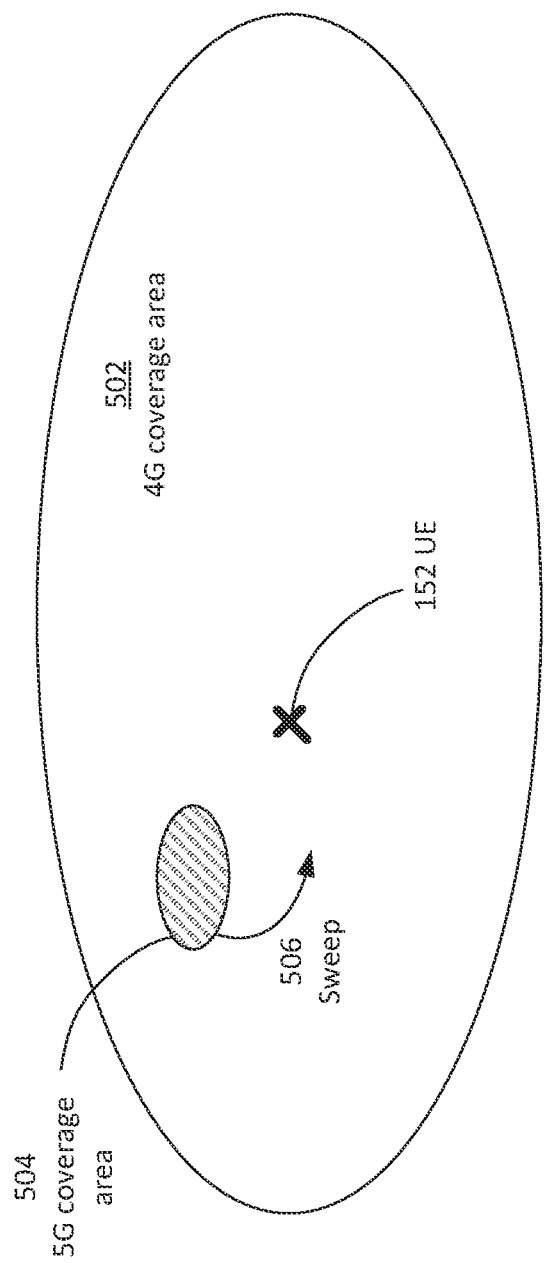
FIGS. 5A and 5B is pictorial diagram of an example scenario in accordance with aspects of the disclosure.

A node of the network may be configured to transmit a plurality of beams having different frequencies. The node of the network may be a terrestrial node, such as terrestrial tower 110, or anon-terrestrial node, such as high-altitude platform 114. For example, as shown in FIG. 5A, the node may be configured to transmit a first beam in a first frequency range (such as, for example, a range including 3.5 GHz) and a second beam in a second frequency range that includes higher frequencies than the first frequency range (such as, for example, a range including 28 GHz). In particular, the first frequency range may be within the range of 4G Long-Term Evolution (LTE) communication signals as defined in a specification of a current or previous version of the standard adopted by the 3$^{rd}$ Generation Partnership Project (3GPP) standard organization or other standard organization. The second frequency range may be within the range of 5G New Radio (NR) communication signals as defined in a specification of a current or previous version of the standard adopted by the 3GPP standard organization or other standard organization. The first beam may provide first large area coverage on the ground, such as covering a geographic area on the order of tens of kilometers wide. The second beam, having the higher frequency, may have a second narrower coverage area on the ground than the first beam.

Figure 5B:
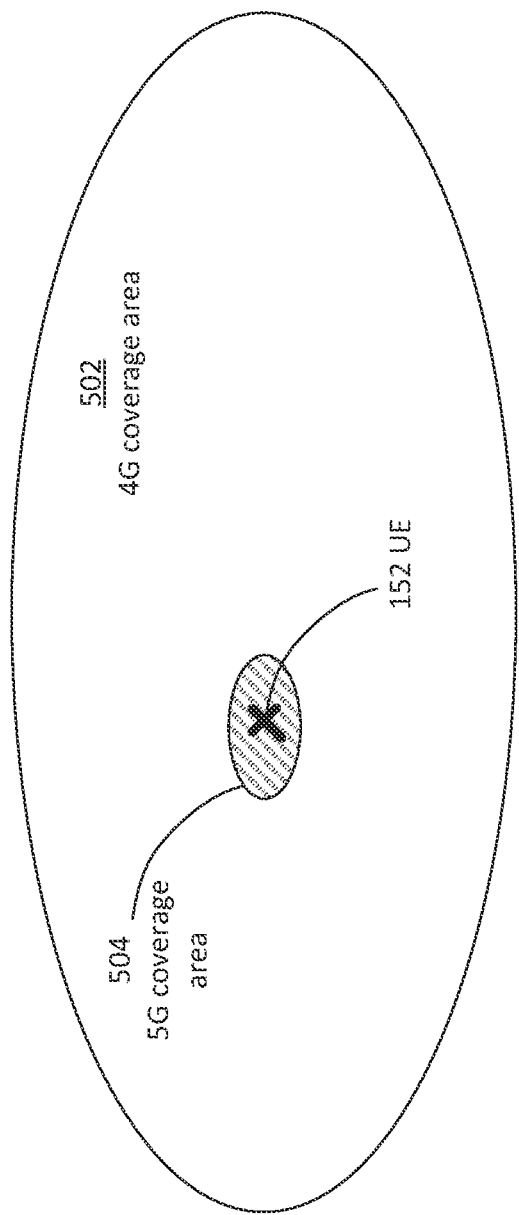

As shown in FIGS. 5A and 5B, the terrestrial tower 110 or the high-altitude platform 114 may transmit a 4G LTE communication beam that provides a 4G coverage area 502 and a 5G NR communication beam that provides a 5G coverage area 504. The 5G coverage area 504 is a smaller area than the 4G coverage area 502. In FIGS. 5A and 5B, the 5G coverage area 504 is shown being cast within the 4G coverage area 502. The client device, or UE, 152 is shown being in a location demarcated by an "x" in the 4G coverage area 502. The demarcated location is not within the 5G coverage area 504.

Figure 6:
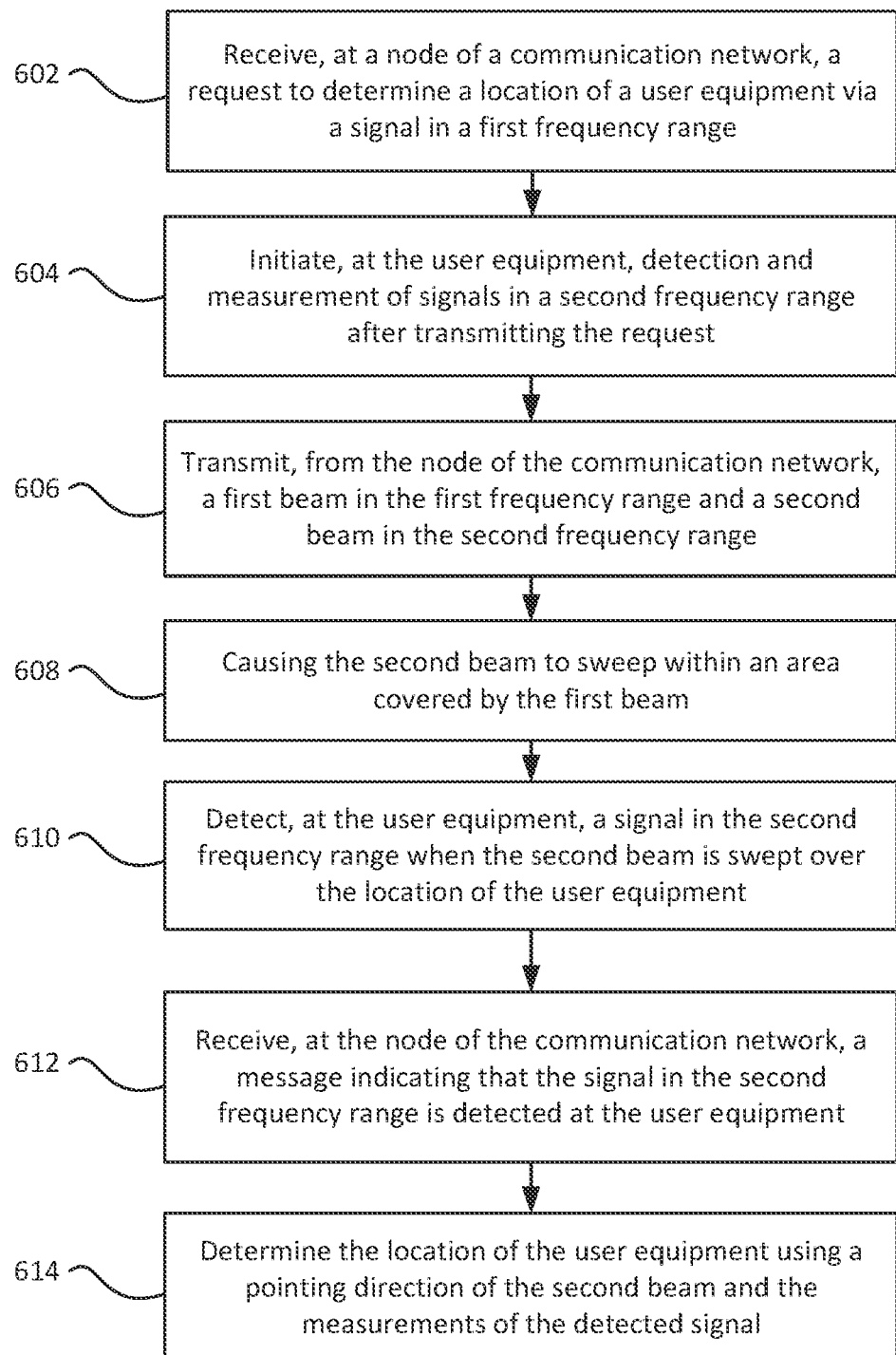
FIG. 6 is a flow diagram of an example method in accordance with aspects of the disclosure.

In FIG. 6, flow diagram 600 is shown in accordance with some of the aspects of this technology that may be performed by one or more processors of nodes of a network, such as that of nodes 110 or 114 or that of UE 152. While FIG. 6 shows blocks in a particular order, the order may be varied and that multiple operations may be performed simultaneously. Also, operations may be added or omitted.

When a UE is capable of detecting each of the frequency ranges of the first and second beams, the location of the UE may be determined using the first and second beams being transmitted from a given node of the network. The UE may be in the first coverage area of the first beam and in communication with the given node using the first frequency range. For example, UE 152 is in the 4G coverage area 502 and in communication with a given node, such as terrestrial node 110 or high-altitude platform 114, using 4G LTE communication signals. The UE 152 may be configured to detect each of the frequency ranges of the 4G LTE communication beam and the 5G NR communication beam.

At block 602, a UE, such as UE 152, that is in range of a node of a communication network, such as node 110 or 114, may transmit a request to the node of the network for determining its location. The request is received at the node of the network. The request may include an indication of the capability of the UE to detect a first frequency range and a second frequency range different from the first frequency range may be communicated with the node. For example, UE 152 shown in FIG. 5A may send the request using a signal in the 4G LTE frequency range or a different type of signal that the UE 152 is capable of using to communicate with the node of the network at its current location. The request of the UE 152 may include an indication that the UE can detect the 4G LTE frequency range and the 5G NR frequency range.

At block 604, the UE may initiate detection and measurement of signals in the second frequency range after transmitting the request. For example, the one or more processors 350 of the UE 152 may turn on and/or actively check one or more sensors of the client device to determine whether a signal in the second frequency range has been received at the one or more sensors. The measurement of the signals may include detecting a received signal strength, received signal quality, timing offset between the UE and the node of the network power, received data rate, or error rate. In some implementations, the UE may also initiate detection and measurements of signals in the first frequency range as well.

At block 606, the one or more processors of the node of the communication network may transmit a first beam in the first frequency range and a second beam in the second frequency range. The first beam and the second beam may be transmitted in response to receiving the request to determine the location of the UE or may be transmitted before receiving the request. In another example, the first beam is transmitted before receiving the request, and the second beam is transmitted after receiving the request. As described above, the first beam covers a larger geographic area than the second beam. The second beam may be transmitted within the coverage area of the first beam. As shown in FIG. 5A, the one or more processors of node 110 or 114 transmits a first beam in the 4G LTE frequency range in a first coverage area 502 that includes the location of the UE 152 and a second beam in the 5G NR frequency range in a second coverage area 504 within the first coverage area.

At block 608, the one or more processors of the node of the network may cause the second beam to sweep an area covered by the first beam after receiving the request to determine the location of the UE. For example, the one or more processors may physically or electronically adjust a pointing direction of a transmitter of the one or more transceivers in the node that is configured to transmit the second beam to move the second beam. Physically adjusting a pointing direction may include moving a gimbal that directs the second beam. Electronically adjusting a pointing direction may include using beamforming techniques to point the second beam in a desired direction. The sweeping of the beam may be performed until an indication that the UE has detected the beam is received, until the UE location is determined, or until the second beam passes over every part of the area covered by the first beam. In addition, the sweeping of the beam may include moving the beam in a set pattern within the area covered by the first beam, such as in a spiral or an "S" pattern. As shown in FIG. 5A, the second beam transmitted from the node 110 or 114 that forms the 5G coverage area 504 may be swept as shown by arrow 506 within the 4G coverage area 502.

In some implementations, the one or more processors of the node of the network may cause the second beam to sweep in the area covered by the first beam for a primary purpose different from determining the location of the UE. Determining the location of the UE may be a secondary purpose performed in parallel to the primary purpose. The primary purpose may be, for example, to search for, point to, and/or form a connection with another terminal. In this implementation, the sweeping of the beam may be performed until the primary purpose is accomplished.

At block 610, the one or more processors of the UE may detect a signal in the second frequency range when the second beam is swept over the location of the UE. For example, when the second beam transmitted from the node 110 or 114 is swept over the location of UE 152 such that the location of the UE 152 falls within the 5G coverage area 504, as shown in FIG. 5B, the UE 152 may detect a signal in the second beam using the one or more sensors of the UE. At block 612, the one or more processors of the UE may transmit a message to the node of the communication network with an indication that the signal in the second frequency range has been detected at a given point in time. The message is received at the node of the network. The message may be sent via a signal in the first frequency range, a signal in the second frequency range, or a different type of signal that the UE is capable of using to communicate with the node of the network at its current location. In the example shown in FIG. 5B, the UE 152 may transmit the message using the 4G LTE frequency range.

At block 614, using a pointing direction of the second beam and the measurements of the detected signal, the one or more processors of the UE or the one or more processors of the node may determine the location of the UE. The pointing direction and the measurements corresponding to the given point in time when the UE detects the signal may be selected for use in the determination. The pointing direction may be determined relative to a location of the node based on one or more sensors on the node or based on tracking performed by the one or more processors of the node. The measurements may include, for example, received signal strength, received signal quality, timing offset between the UE and the node of the network, received data rate, error rate, or other type of signal characteristic. For example, the pointing direction of the second beam forming the 5G coverage area 504 at the point in time shown in FIG. 5B may be determined by the one or more processors of the node 110 or 114. In addition, the measurements taken of a signal from the second beam detected at the UE 152 at the point in time shown in FIG. 5B may be determined by the one or more processors of the UE 152. When the location is to be determined by the one or more processors of the node 110 or 114, the UE 152 may transmit one or more measurements to the node 110 or 114 via a signal in the 4G LTE frequency range. When the location is to be determined by the one or more processors of the UE 152, the node 110 or 114 may transmit the pointing direction of the second beam or a location of the second beam derived from the pointing direction to the UE 152 via a signal in the 4G LTE frequency range. Alternatively, the signal carrying the pointing direction or the measurements may be transmitted via a signal in the 5G NR frequency range.

The location may be determined by determining an area where the second beam is pointed at the point in time and comparing the measurements of the signal at the point in time to expected measurements for the second beam when received at the UE. The location may additionally or alternatively be determined by comparing the measurements to expected measurements for the second beam at a given point in the set pattern or changes in measurements for the second beam at given points in the set pattern. In another implementation, the location may be determined based on a relationship between measurements for the second beam and measurements for the first beam as the second beam is moved.

The determined location of the UE may be used to establish a communication channel between the UE and the node or other neighboring nodes in the communication network. The communication channel may be within the frequency range of the second beam that is narrower in width and a higher frequency range than the first beam For example, the UE 152 may establish a communication channel with node 110 or 114 using a frequency range within the 5G NR frequency range. Additionally or alternatively, a trajectory of the UE 152 may be determined based on the determined location and the one or more processors of the UE 152 or the node 110 or 114 may determine that a handover should be performed to provide continuous coverage to the UE 152 based on the trajectory. A communication channel may be established between the UE 152 and another node in the network, such as terrestrial tower 112, by performing the handover from the node 110 or 114. The communication channel with the new node may be using the 4G frequency range, the 5G NR frequency range, or another frequency range available from the new node.

Figure 7:
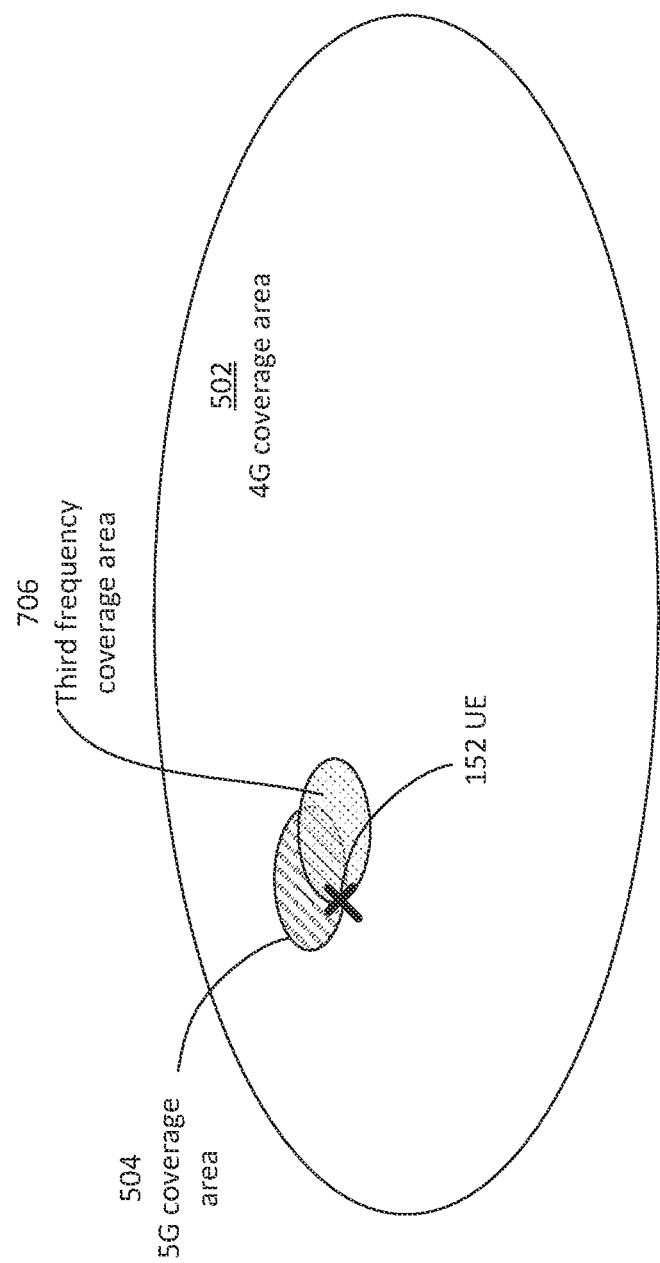
FIG. 7 is a pictorial diagram of another example scenario in accordance with aspects of the disclosure.

In another implementations, a third beam may also be transmitted by the node having a third frequency range different from the first frequency range and the second frequency range (such as a range including 700 MHz). The third beam may form a third coverage area on the ground smaller than the first coverage area, similar to the second coverage area. In some implementations, at least one of the plurality of beams may be transmitted from a second node of the network. As shown in FIG. 7, the UE 152 may be located in the 4G coverage area 502 that is formed by one or more processors of node 110 transmitting a first beam in a first frequency range. The 5G coverage area may be transmitted within the 4G coverage area 504 by one or more processors of node 110 transmitting a second beam in a second frequency range. In addition, a third beam having a third frequency range may also be transmitted to form a coverage area 706 within the 4G coverage area 504. This third beam may be transmitted by the node 110 or alternatively by node 114. The client device, or UE, 152 is shown being in a location demarcated by an "×" in the 4G coverage area 502. The demarcated location is not within the 5G coverage area 504.

Figure 8:
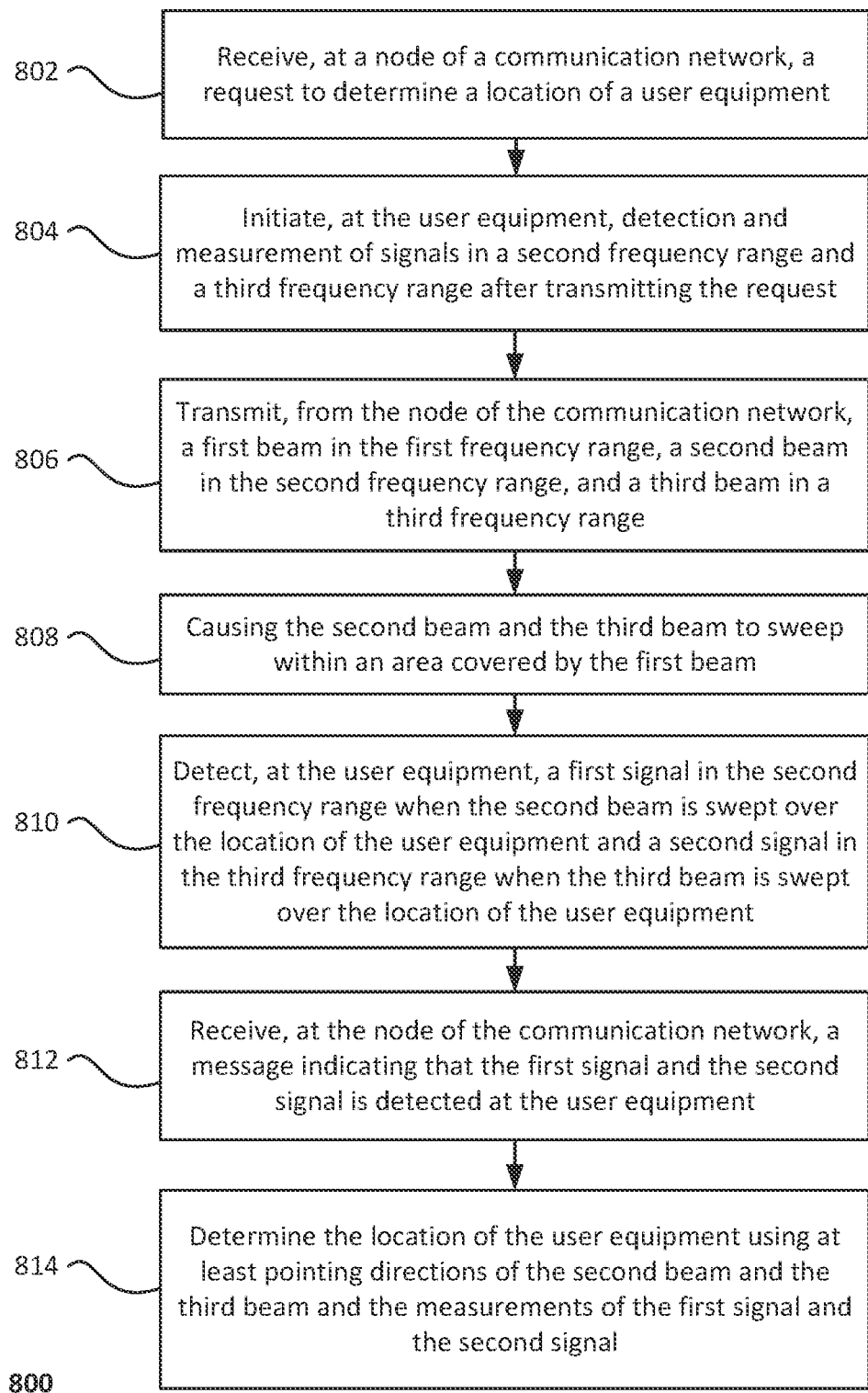
FIG. 8 is a flow diagram of another example method in accordance with aspects of the disclosure.

In another implementation, the node of the network may be capable of transmitting the first, second, and third beams, and a UE may be capable of detecting each of the frequency ranges of the first, second, and third beams. In FIG. 8, flow diagram 800 is shown in accordance with some of the aspects of this implementation that may be performed by one or more processors of nodes of a network, such as that of nodes 110 or 114 or that of UE 152. While FIG. 8 shows blocks in a particular order, the order may be varied and that multiple operations may be performed simultaneously. Also, operations may be added or omitted.

A method for locating a UE in this implementation includes the following:

At block 802, the UE transmits the request for determining its location, as described above with respect to block 602. At block 804, the UE initiates detection and measurement of the second and third frequency ranges in a same or similar manner described above with respect to block 604.

At block 806, the one or more processors of the node transmits the first beam, the second beam, and the third beam. The first and second beams may be transmitted in a same or similar manner as described above with respect to block 606. The third beam may be transmitted using a different transceiver of the node than is used to transmit the first and second beams. The third beam also covers a smaller geographic area than the first beam. In one alternative implementation, the third beam is transmitted from another node of the network using the one or more processors of the other node. The first, second, and third beam may be transmitted in response to receiving the request to determine the location of the UE or may be transmitted before receiving the request. In another example, the first beam is transmitted before receiving the request, and the second and third beams are transmitted after receiving the request. As shown in FIG. 7, the one or more processors of node 110 transmits a first beam in the 4G LTE frequency range in a first coverage area 502 that includes the location of the UE 152. The one or more processors of the node 110 also transmits a second beam in the 5G NR frequency range in a second coverage area 504 within the first coverage area and a third beam in a third frequency range different from the ranges of the first and second beams in a third coverage area 706 within the first coverage area.

At block 808, the one or more processors of the node of the network may cause the second beam and the third beam to sweep an area covered by the first beam in a same or similar manner described above with respect to block 608. The third beam may be moved in a same pattern as the second beam. When the second beam and the third beam are moved jointly in the same pattern, the second and third beams may be fixed in a relative position such that the coverage areas of the second and third beams partially overlap. For example, as shown in FIG. 7, the 5G coverage area 504 is shown partially overlapping the third frequency coverage area 706. This overlap configuration of the 5G coverage area 504 and the third frequency coverage area 706 may be fixed such that the beams move together while sweeping the 4G coverage area 502. Alternatively, the third beam may be moved independent from the second beam in a same or different pattern than the second beam. In some implementations, the third beam may be transmitted and swept in the first coverage area after the second beam has been transmitted and swept in the first coverage area.

At block 810, the one or more processors of the UE may detect a first signal in the second frequency range when the second beam is swept over the location of the UE and a second signal in the third frequency range when the third beam is swept over the location of the UE. The detection for each signal may be performed in a same or similar manner as described above with respect to block 610. The first signal may be detected at a first point in time, and the second signal may be detected at a second point in time. The first point in time and the second point in time may be a same or different point in time. In the example shown in FIG. 7, the UE 152 may detect a first signal when an edge of the 5G coverage area 504 reaches the location of the UE 152 at a first point in time. The UE 152 may detect a second signal when an edge of the third frequency coverage area 706 reaches the location of the UE 152 at a second point in time. As shown, given the location of the 5G coverage area 504 at the first point in time and the location of the third frequency coverage area 706 at the second point in time, an edge of the 5G coverage area 504 and an edge of the third frequency coverage area 706 intersects at the location of the UE 152. In other examples, the location of the UE 152 may be in an overlap area of the 5G coverage area 504 and the third frequency coverage area 706.

At block 812, the one or more processors of the UE may transmit a message to the node of the communication network with an indication that the first signal in the second frequency range has been detected at the first point in time and the second signal in the third frequency range has been detected at the second point in time. The message is received at the node of the network. The message may be sent via a signal in the first frequency range, a signal in the second frequency range, or a different type of signal that the UE is capable of using to communicate with the node of the network at its current location. When the third beam is transmitted by another node in the network, the message to the node may only have an indication relate to the first signal being detected at the first point in time, and the one or more processors of the UE may transmit a separate message to the other node of the network with an indication that the second signal in the third frequency range has been detected at the second point in time. In the example shown in FIG. 7, the UE 152 may transmit the message using the 4G LTE frequency range to node 110 or 114.

At block 814, using the pointing directions of the second and third beams, as well as the measurements of the signals in the second and third frequency ranges, the one or more processors of the UE or the one or more processors of the node may determine the location of the UE. The pointing direction and the measurements may be determined in a same or similar way as described above with respect to block 614. The transmission of the pointing direction or the measurements may also be performed in a same or similar way as described above with respect to block 614. In some cases, the location may additionally or alternatively be determined based on the set patterns of the second and third beams. For example, the measurements of each beam may be compared with expected measurements of each beam at given points of the patterns or changes in measurements for each beam at given points in the corresponding patterns.

In another implementation, the pointing direction of the first beam and the measurements of the signal in the first frequency range may also be used to trilateration methods. In this example, the location may be determined based on a relationship between measurements for the first, second, and/or third beams as the beams are moved in their corresponding patterns. This determination may be same or similar to trilateration using the intersection of the three different coverage areas of the first, second, and third beams. The determined location of the UE may be used to establish a communication channel between the UE and the node.

An alternate implementation may involve transmitting the first beam from a first node of the network and transmitting the second beam (and in some cases the third beam) from a second node of the network. In this implementation, the UE may transmit the request to the first node when in range of the first node, and the first node may communicate with the second node to request transmission of the second beam (and in some cases the third beam). Alternatively, the UE may transmit the request to both the first and second nodes when in range of both nodes.

The features disclosed herein may allow for a more seamless integration of 5G-enabled non-terrestrial nodes with existing terrestrial nodes that provide another type of coverage, such as 4G LTE. The 5G-enabled non-terrestrial nodes may then be used to supplement, expand, or strengthen the coverage of existing networks. For example, the service reliability of a network may be reinforced for M2M or IoT devices or for passengers onboard moving platforms. Multicast and broadcast resources for data may also be provided using the 5G-enabled non-terrestrial nodes, especially towards the network edges or at user terminals. In addition, non-terrestrial nodes, such as high-altitude balloons, may be used to expand network coverage into areas having little to no infrastructure for terrestrial networks. The use of non-terrestrial nodes may reduce the time and cost required to plan and install additional terrestrial nodes, especially in more remote areas.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of determining a location of a user equipment, the method comprising:
   transmitting, by one or more processors from a node of a network, a first beam having a first frequency range in a first area and a second beam having a second frequency range in a second area;
   receiving, by the one or more processors, a request for determining the location of the user equipment in a first signal that is in the first frequency range;
   enabling, by the one or more processors, the second beam to sweep within the first area;
   determining, by the one or more processors, a second signal from the user equipment indicating when the second beam is swept over the location of the user equipment; and
   determining the location of the user equipment based on a pointing direction of the second beam relative to a position of the node of the network.

2. The method of claim 1, wherein the first frequency range is within a range of 4G Long-Term Evolution (LTE) communication signals, and the second frequency range is within a range of 5G New Radio (NR) communication signals.

3. The method of claim 1, wherein transmitting the second beam occurs after the receiving of the request.

4. The method of claim 1, wherein the request includes an indication of a capability of the user equipment to detect the first frequency range and the second frequency range.

5. The method of claim 1, wherein the enabling of the second beam to sweep within the first area includes physically adjusting a pointing direction of the second beam.

6. The method of claim 1, wherein the enabling of the second beam to sweep within the first area includes adjusting a pointing direction of the second beam using beamforming techniques.

7. The method of claim 1, wherein the enabling of the second beam to sweep includes causing the second beam to sweep in a set pattern.

8. The method of claim 1, wherein the enabling of the second beam to sweep within the first area until the location of the user equipment is determined.

9. The method of claim 1, further comprising:
   transmitting a third beam having a third frequency range in a third area, the third area being smaller than the first area and being encompassed by the first area;
   causing the third beam to sweep within the first area; and
   receiving a third signal from the user equipment indicating when the third beam is swept over the location of the user equipment; and
   wherein the determining of the location of the user equipment is further based on a pointing direction of the third beam.

10. A system for determining a location of a user equipment, the system comprising:
    one or more transceivers configured to transmit and receive communication beams comprising one or more signals, the communication beams including a first beam having a first frequency range and a second beam having a second frequency range; and
    one or more processors configured to:
    transmit, using the one or more transceivers, the first beam in a first area and the second beam in a second area;
    receive, via the one or more transceivers, a request for determining the location of the user equipment in a first signal that is in the first frequency range;
    enable the second beam to sweep within the first area;
    determine, via the one or more transceivers, a second signal from the user equipment indicating when the second beam is swept over the location of the user equipment; and
    determine the location of the user equipment based on a pointing direction of the second beam relative to a position of the system.

11. The system of claim 10, wherein the first frequency range is within a range of 4G Long-Term Evolution (LTE) communication signals, and the second frequency range is within a range of 5G New Radio (NR) communication signals.

12. The system of claim 10, wherein the one or more processors are configured to transmit the second beam after receiving the request.

13. The system of claim 10, wherein the request includes an indication of a capability of the user equipment to detect the first frequency range and the second frequency range.

14. The system of claim 10, further comprising a gimbal; and wherein the one or more processors are configured to enable the second beam to sweep using the gimbal to physically adjust a pointing direction of the second beam.

15. The system of claim 10, wherein the one or more processors are configured to enable the second beam to sweep within the first area using beamforming techniques.

16. The system of claim 10, wherein the one or more processors are configured to enable the second beam to sweep in a set pattern.

17. The system of claim 10, wherein the one or more processors are configured to enable the second beam to sweep within the first area until the location of the user equipment is determined.

18. The system of claim 10, wherein the one or more transceivers are further configured to transmit and receive a third beam having a third frequency range; and wherein the one or more processors are further configured to:

transmit the third beam in a third area, the third area being smaller than the first area and being encompassed by the first area;

enable the third beam to sweep within the first area;

receive a third signal from the user equipment indicating when the third beam is swept over the location of the user equipment; and determine the location of the user equipment further based on a pointing direction of the third beam.

19. The system of claim 10, further comprising a high-altitude platform terminal.

20. A non-transitory, computer-readable medium including instructions that, when executed by one or more processors, cause the one or more processors to perform a method of determining a location of a user equipment, the method comprising:

transmitting a first beam having a first frequency range in a first area and a second beam having a second frequency range in a second area;

receiving a request for determining the location of the user equipment in a first signal that is in the first frequency range;

enabling the second beam to sweep within the first area;

determining a second signal from the user equipment indicating when the second beam is swept over the location of the user equipment; and determining the location of the user equipment based on a pointing direction of the second beam.

* * * * *